United States Patent [19]

Kobetsky

[11] 4,128,449
[45] Dec. 5, 1978

[54] INDUCTION HEATING FIXTURE FOR APPLYING ADHESIVE-BACKED ARTICLES

[75] Inventor: Robert G. Kobetsky, Chicago, Ill.

[73] Assignee: Illinois Tool Works Inc., Chicago, Ill.

[21] Appl. No.: 837,059

[22] Filed: Sep. 28, 1977

[51] Int. Cl.² ...................... B32B 19/02; B23K 13/02
[52] U.S. Cl. .................................. 156/380; 219/10.53
[58] Field of Search ............... 156/380, 556, 272, 275; 219/10.53, 10.49

[56] References Cited

U.S. PATENT DOCUMENTS

| 3,562,054 | 2/1971 | Wolf | 156/275 |
| 3,574,028 | 4/1971 | Hurst et al. | 156/380 |
| 4,048,458 | 9/1977 | Zirk | 156/275 |

Primary Examiner—Douglas J. Drummond
Attorney, Agent, or Firm—Thomas W. Buckman; Robert W. Beart

[57] ABSTRACT

A fixture for accurately applying discrete adhesive-backed articles to a support surface through the use of induction heat. Aligning and positioning means are associated with the faces of U-shaped cores to keep the end faces of the core in abutting relationship with the article being heated but permit the article and core combination to move slightly in compound direction to accommodate support surface variations or curvature.

17 Claims, 10 Drawing Figures

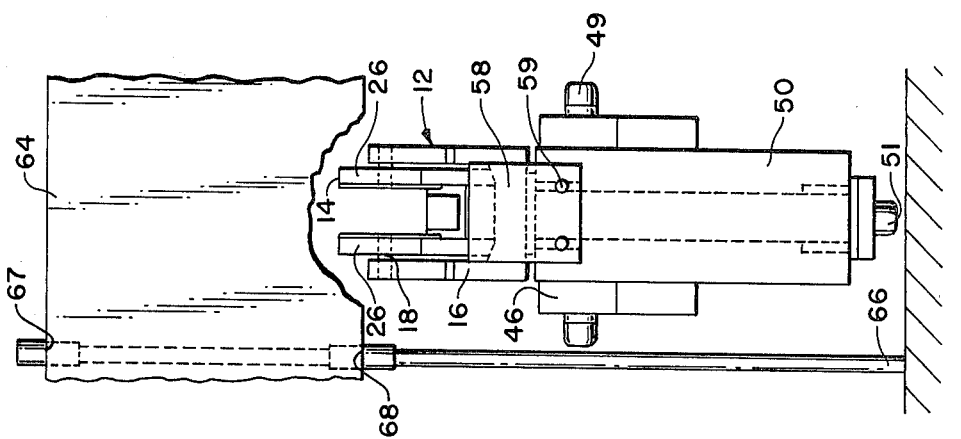
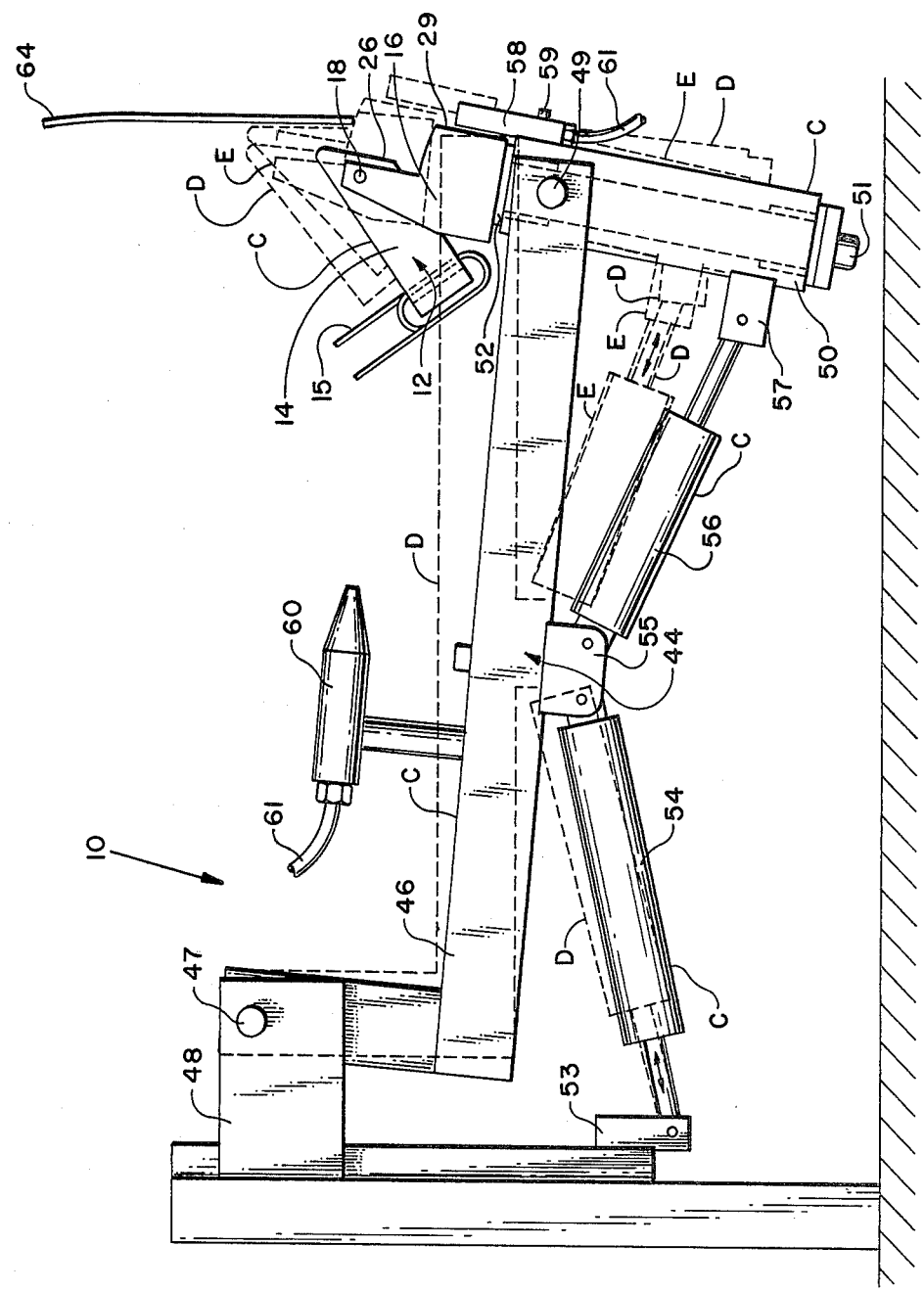

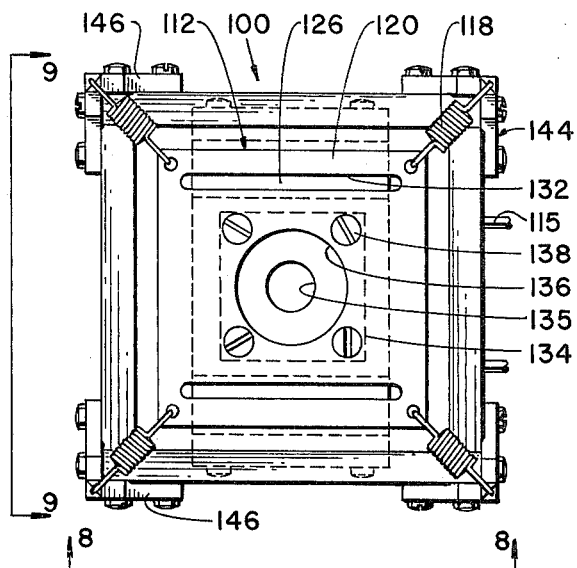

INDUCTION HEATING FIXTURE FOR APPLYING ADHESIVE-BACKED ARTICLES

BACKGROUND OF THE INVENTION

This invention relates to an induction heating apparatus and more particularly to an apparatus which is designed to heat, conductive, adhesive-backed fasteners.

Induction heating techniques for the securement of heat activable adhesive are known generally in the prior art. More particularly, the use of a U-shaped core in association with an article to be heated has been found to be an effective and efficient manner of generating heat in an adhesive-backed conductive article. In such a system, the upper surface of the conductive article is positioned to bridge the legs of the core so that a magnetic flux circuit is completed between the core and the article. Since the core will typically be of a low loss material and the article will be of a high loss material, heat is effectively generated by eddy currents in the article and hysteresis effect. The heat generated in the article thus serves as the source to activate the adhesive coating.

Although one of the major advantages of such a system is the efficiency in which heat can be generated and utilized, it becomes important that the article to be heated is accurately and carefully positioned relative to the end faces of the core so that the heating pattern is uniform and so there is a minimum of flux loss in the system since the flux density in the article is directly related to the amount of heat generated therein.

A proper adhesive bond also requires carefully controlled pressure to be exerted on the article during the heating and flowing of the adhesive so that the faying surfaces are subjected to the maximum wetting.

High-production rate applications of adhesive-backed articles, including applications requiring a plurality of articles to be assembled substantially simultaneously on a predetermined area of a support surface, are particularly sensitive to the situations noted above and therefore there is a need for a properly designed fixture for uniformly and accurately applying heat and pressure to an adhesive-backed article which will accommodate various support surfaces and/or curvatures thereof.

SUMMARY OF THE INVENTION

It is, therefore, an object of the present invention to provide a fixture for adhesively securing articles utilizing a U-shaped core.

A still further object of the invention is to provide a fixture which will carry an article to be heated in relative immovable contact with a core and yet permit the core and article to experience slight compound movement when associated with a workpiece.

A still further object of the invention is to provide a fixture which incorporates an article receiving and supporting structure for carefully aligning an article to be heated with the end surfaces of the U-shaped core for predictably, adhesively, securing the article to a support surface.

A particular advantage of the present invention is the ability of the fixture to retain the article to be heated in fixed aligned contact with the core and yet permit the core and the article to move slightly in planes transverse to the plane of the support surface while securing the article relative to movement in the plane of the support surface.

Yet a further advantage of the invention is the ability of the fixture to apply sufficient, controlled pressure to the adhesive surface without jeopardizing the accurate positioning of the article relative to the support or the core.

The foregoing and other objects and advantages are attained in the present invention through the use of a head structure which incorporates a U-shaped core and an article receiving and positioning means fixedly mounted to the core and with the head structure itself resiliently mounted to a carrying structure. In one embodiment of the invention, the head structure is mounted to the carrier by bearing means permitting free compound movement, consisting of rotation about two axes, allowing the article to be conformally positioned on the support surface by adjustment motions in directions transverse the plane of the surface. In a second embodiment of the invention, the head structure is mounted by coil springs located generally in the plane of the article to be heated, permitting relatively free resilient movement in directions transverse to the surface of attachment but resisting movement in the plane of the surface. In both of the embodiments described, a compound movement of the head in directions to and/or from the surface of application are permitted but movements generally in the plane of the surface to be heated are restricted thus insuring that the article to be heated will conform to the various curvatures of the surface but preserve the precise location of the article on the surface.

BRIEF DESCRIPTION OF THE DRAWINGS

Other objects and advantages of the invention will become apparent upon reading the following detailed description and upon reference to the drawings in which:

FIG. 1 is a side elevational view of a fixture embodying the features of the invention.

FIG. 2 is an end elevational view of the fixture embodying the features of the invention.

FIG. 7 is a top plan view of a further embodiment of the invention.

FIG. 8 is a side elevational view of the embodiment shown in FIG. 7 taken in the direction of lines 8—8.

FIG. 9 is a partially broken-away side elevational view taken in the direction of line 9—9 of FIG. 7.

FIG. 10 is a perspective view of a fastener which may be applied using the invention shown in FIGS. 7-9.

DETAILED DESCRIPTION OF THE PREFERRED EMBODIMENTS

Figure 4:
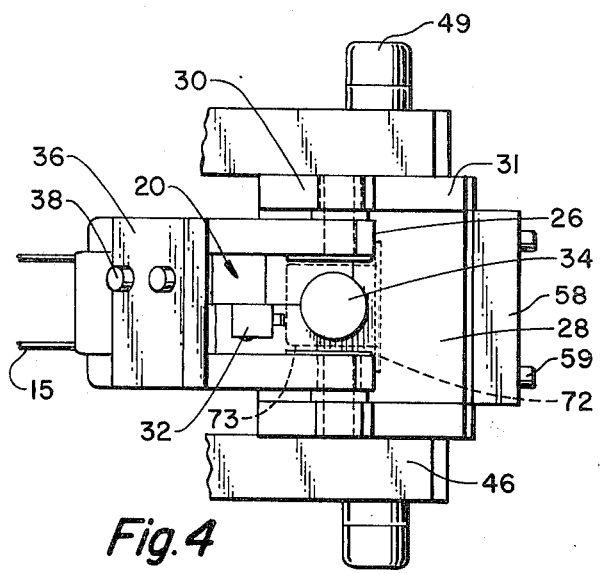
FIG. 4 is an enlarged top plan view of the head structure of the invention.

Referring first to FIGS. 1-6, a preferred embodiment of a fixture 10 is shown to comprise a head structure 12 and a carrier 44 for the head structure which, in a manner described later herein, positions the head and applies force to the head for adhesively securing an article to a support surface. The composite head structure includes a U-shaped core 14, pivotally connected to the upstanding legs of a yoke 16, and further includes an article receiving and positioning block structure 20 secured intermediate the legs of the core.

The carrier structure is basically a series of articulated beams or levers capable of selectively moving the head to a plurality of locations relative to a fixed support surface. A cantilever beam member 46 is pivotally secured to a fixed support 48 and a free extremity of the beam 46 carries a lever arm 50. The upper extremity of the lever 50 carries the head structure adjacent a pivotal attachment between the cantilever beam and lever. A set of motor devices 54 and 56 selectively move the beam 44 and the lever 50 to sequentially position the head into operative engagement with a fixed panel 64.

Figure 3:
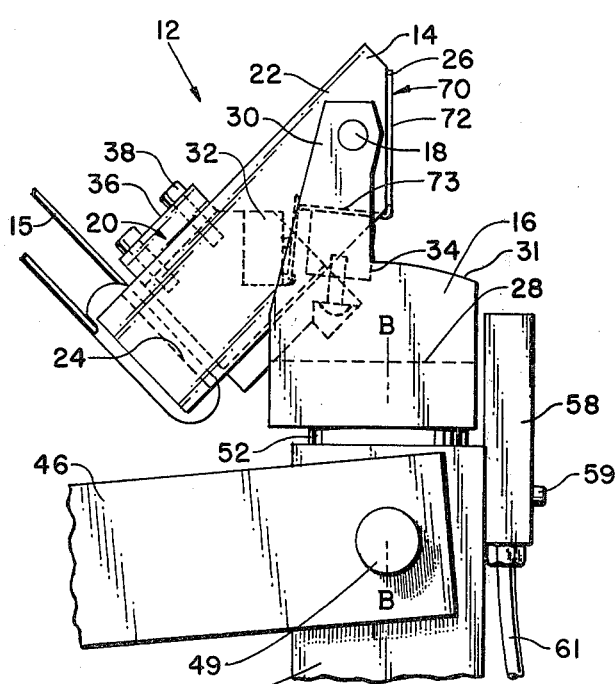
FIG. 3 is an enlarged partial side elevational view of the head structure of the invention.
Figure 5:
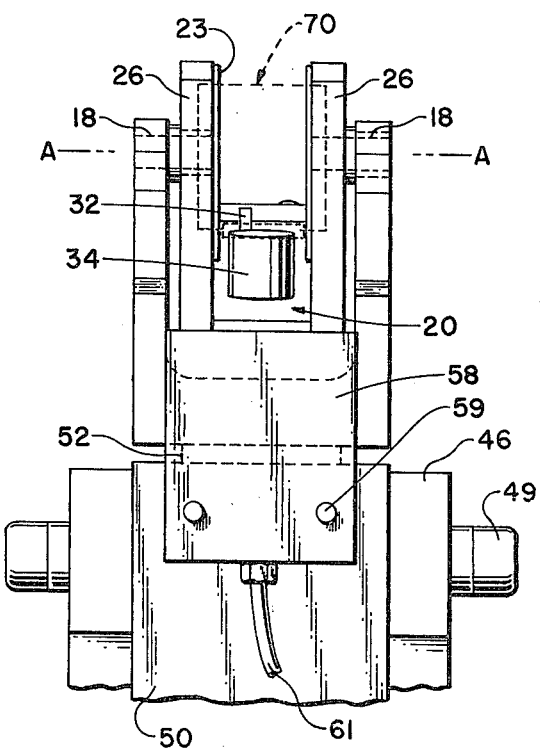
FIG. 5 is an enlarged end elevational view of the head structure of the invention.
Figure 6:
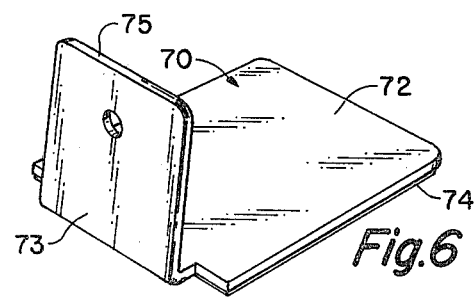
FIG. 6 is a perspective view of an article which may be applied using the features of the invention.

Having observed the basic structure of the fixture, attention may now be given to the details of the head structure 12. Turning to FIGS. 3-5, it will be shown that the head comprises a U-shaped core 14 which includes a pair of legs 22 interconnected by a bridge section 24 with an exciter coil 15 wound about the bridge section. End faces 26 at the extremity of the legs are preferably formed at a bias to the legs to accommodate the particular part described in the drawing. The extremities of the legs of the core are pivotally secured to upstanding legs 30 of a yoke section 16. Bearing means 18 provide, at least limited, rotation of the core about an axis AA relative to the yoke. The yoke is configured to include a base 28 and a shoulder 31 which is adapted to be positioned beneath the edge of a support surface 64. The yoke is secured to the uppermost extremity of the lever arm 50 with a bearing sleeve 52 permitting at least limited rotation of the yoke and core about an axis BB, substantially coincident with the length of the arm 50. This axis of rotation BB is substantially perpendicularly disposed to the axis of rotation AA. Thus, the combination of the effects of bearings 52 and 18 provide a relatively free compound movement for the part carrying core 14 transverse the plane or coplanar to the plane of the attachment surface.

An article receiving and retaining block 20 is secured within the core primarily through the use of securement plate 36 and clamping fasteners 38. The block 20 is of an insulative material and carriers a cylindrical magnet 34 and an article presence sensing switch 32. Thus, when an article, such as 70, is positioned with its upstanding tab 73 on the magnet, the top edge 75 of the tab contacts the switch indicating that an article is properly positioned for heating. The upper surface of the base 72 is carefully aligned with the end surfaces 26 of the core providing the proper abutting contact between the core and the article. An insulative pad 23 may be provided on both sides of the inner surfaces of the legs snugly receiving the tab within the legs of the core to insure that each article is accurately and predictably positioned as well as providing a wear resistant coating for the inner surfaces of the legs.

The operation of the fixture 10 may be understood with reference to FIGS. 1 and 2. The fixed beam or support structure 48, which may be part of a table structure or the like, pivotally carries an L-shaped cantilever beam 46 through a bearing-type joint 47. The free extremity of the beam 46 likewise carries a lever arm 50 through a bearing joint 49. The carrier in an at rest position assumes the position represented as solid lines identified by the legend C in FIG. 1. A motor device in the form of an air cylinder 54 is activated to raise the beam 46 to an intermediate position indicated by dotted lines identified by the legend D. The air cylinder 54 is pivotally secured to the fixed structure 48 at a joint 53 and to the beam 46 at a position intermediate its extremities at a pivotal joint 55. Attention is also directed to the positionment of the head structure 12 as a result of the first movement of the beam. Dotted line position D indicates that the head is moved upwardly to a position closely adjacent but slightly spaced from a predetermined area of fastening on a panel 64.

A second movement of the fixture is subsequently provided through another motor means 56 which is also in the form of an air cylinder. Air cylinder 56 is pivotally interconnected to a position intermediate the cantilever beam 46 and to a lowermost extremity of the lever arm 50. These pivotal connections are respectively obtained by pivotal joints 55 and 57.

Air cylinder 56 creates a motion which pulls the lower extremity of the lever arm 50 inwardly thus forcing the uppermost extremity and the head structure 12 outwardly. A carefully controlled movement thus creates the necessary pressure against the panel 64 by the article 70, which is carried by the head 12. The final position of the fixture, including the clamping positionment of the head, is shown by the dotted line configuration identified by the legend E. It should be noted that the panel 64 is securely and fixedly retained on a support structure relative to the head so that it presents a firm surface upon which to apply the article. For example, a panel of given width and a predetermined length is positioned on a support member 66 with appropriately positioned lower shoulders 68 and upper shoulders 67 retained in the panel thereon.

With the article 70 being carried by the block 20 in such a manner as to maintain abutting contact with the end surfaces of the core during movement of the core, the pivotal means 18 and 52 permit the adhesive bearing surface of the article to conformally abut a selected surface on the panel 64. Thus, the article can be accurately positioned on a surface and obtain the necessary, uniform bonding layer even though there may be a slight curvature in the surface or large tolerances to be overcome between the fixture and the panel.

It should be apparent that a plurality of carrier means 44 can be simultaneously carried and activated by a support structure 48. Thus, a plurality of identical or similar articles 70 can be secured at the same time on a selected area of a work panel. The article presence switch 32 performs a valuable function when a plurality of heads are used and proper quality control is desired. For example, if one of the heads of a plurality of heads does not have the article positioned or properly positioned therein, the switches could be connected in series to prevent the functioning of the fixture until the discrepancy is corrected.

Following the actuation of the second air cylinder 56, the fixture and head assume the dotted line position denoted by legend E. In this position, the article 70 is securely clamped with a predetermined, sufficient pressure against the work panel 64. The exciter coil 15 is then activated and the magnetic flux circuit is formed between the legs of the core and the base 72 of the article with abutting contact being maintained and carefully controlled between the core end surfaces 26 and the article upper surface 72.

While a certain amount of movement of the head structure about axes AA and BB is desired, unlimited unrestrained movement may not be advisable. Therefore, a plate member 58 may be secured to the beam 50 with fastener 59, or alternately to the yoke 16, providing a slight spacing between the plate 58 and the front surface 29 of the yoke. Thus, while the yoke may be free to rotate about an axis BB generally longitudinally of the arm 50, the rotation is limited to vernier-like corrections to conformally mate the article to the panel 64. Likewise, the rotation about axis AA is limited by the interaction of the core with the base of the yoke. The core is mounted to be biased downwardly by gravity so any movement will be restrained by the bridge, by the base of the yoke and by gravity. It should be noted that the limited moement provided by the head structure is in directions transverse the plane of the work panel 64 and not in a plane parallel to or coextensive with the work panel, thus preventing any sliding movement of the part during the force applying operation.

Air cooling jets 60 fed by air lines 61 may be provided to the fixture to facilitate the cooling of the head. Likewise, an air line 61 can be attached to ports in the rotation limiting plate 58 to give a more direct cooling jet of air to the head structure.

It should be apparent that the basic features of the invention can be utilized in a variety of fixtures suitable for a variety of adhesive fastening devices. With this in mind, attention is now directed to FIGS. 7–10 which describe a further embodiment of a fixture for use with a different fastener device.

In FIG. 10 a fastening device is disclosed consisting primarily of a flat base 172 carrying a layer of adhesive 175 on the lower surface. The side margins of the base are formed with upturned flanges 174 and a secondary fastening device, such as a stud 173, is preassembled to the base. This type of fastener can be advantageously and efficiently secured to a support structure, such as a plate of glass 164, through the use of a fixture 100.

Fixture 100, in accordance with the basic teachings of the invention, includes a head structure consisting of a U-shaped core 114, an article aligning plate member 120 secured to the core by a frame structure 116. A carrier device 144 carries and suspends the head and supports it when it is brought into compressive contact with a work panel 164. The carrier basically includes four upstanding posts 146 and a base 150 which are fixedly secured to one another.

The head structure 112 is resiliently secured to the carrier through the use of four tension spring members 118 interconnecting the corners of the posts with the corners of the rectangular shaped article receiving plate 120. The base of the head is supported relative to base 150 of the carrier by a rather stiff coil compression spring 152, preferably stabilized and aligned by a shaft extension 158 of an air cylinder or other motor means 156 and resting in a bore 157 of a sleeve extension 159. The sleeve fixed in a support panel 161 with a cover panel 160 provided with a clearance aperture to the sleeve.

The U-shaped core includes a pair of legs 122 and a bridge section 124 with an exciter coil 115 wound about the bridge. The end surfaces 126 of the core are adapted to be associated with the flanges 174 of the article 170. The reliable and accurate association of a part, such as fastener 170, is achieved by the article receiving and aligning plate 120 which is configured to include a pair of elongated slots 132 dimensioned to receive the flanges 174 of the article. The plate 120 will be of an insulative material and secured relative to the core through the use of an insulative block 134 positioned intermediate the legs of the core. The block and plate are fixedly secured to each other through fasteners 138. The block will include a bore 135 and a counterbore 136 to receive the threaded stud portion 173 and the flange portion of the fastener, respectively. The block member is fixedly secured to the core with a frame structure comprising side frame members 128, cross frame members 129, and a base frame member 130. The block and frame members are fixedly secured to each other by fasteners 139. Side frame members 128 may also be secured to the outside surface of the legs through an adhesive layer 131. Thus, the frame, core and article receiving plate and block are all fixedly secured relative to one another but are relatively flexibly secured and carried by the support structure 144 by coil springs 118 and 152. The corner tension springs 118 permit relatively free movement of the head in a direction or directions transverse the plane of the attachment surface 164, but will resist movement in the plane of or a plane parallel to the plane of the attachment surface. Compression spring 152 will transmit the necessary predetermined resilient bearing force to properly position the part against the surface 164 through the operation of air cylinder 156, to maintain a proper bond line during the activation of the adhesive. As in the preferred embodiment described earlier above, a plurality of carriers and head structures may be provided in a single unit to secure a plurality of articles 170 substantially simultaneously to a predetermined area of a support structure 164.

While the invention has now been described in connection with two embodiments, a person skilled in the art will appreciate that the invention is not necessarily limited to the embodiments. The invention described herein provides for a head structure in an induction heating system which includes an article receiving means fixedly secured to the U-shaped core so that a part or article can be carried and moved together without disturbing the abutting relationship between the end faces of the core and the part to be heated. The head structure thus defined may, however, be resiliently or pivotally associated with a carrying structure to permit limited, free movement of the head in directions transverse the plane of adhesive securement when associated with a work surface so that the article may conform to various curvatures or surface variations of the adherend surface and yet prevent movement of the article and the head in the plane of or parallel to the plane of the faying surface. Such a movement in the plane of the faying surface obviously prevents the part from being accurately positioned on the surface and does not contribute to efficient bonding.

Thus, it is apparent that there has been provided, in accordance with the invention, a fixture including a head structure comprising a U-shaped core and an article receiving and carrying member that fully satisfies the objects, aims and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

I claim:

1. In a fixture for adhesively securing discrete, substantially flat based adhesive carrying metal articles to a support surface, including a carrier structure with an aritcle applying head structure mounted thereon, the head structure comprising a U-shaped inductor core with exciter coil means wrapped about a section thereof serving to generate a magnetic flux circuit through said core and a portion of the metal article bridging the end surfaces of the legs of the core, the head structure further comprising an article receiving and positioning element fixedly mounted to the core to retain, predetermined, laterally spaced upper surface regions of the metal article in substantially fixed abutting contact with the end surfaces of the core during the positionment of the article on the support surface, the head structure and mounting means therefore including means to permit free compound movement of the core in a direction transverse an axis of the carrier structure which extends so as to intersect the support surface with the metal article fixedly positioned relative to the core as the head and carrier apply the metal article to the support surface so as to accurately and firmly position the article into conforming surface contact with a predetermined area of said support surface during the generation of heat in said article to activate the adhesive.

2. The fixture of claim 1, wherein the carrier structure includes first means to move the head from a first, rest position to a second position wherein the faying surface of the article is spaced from, but closely adjacent to, the desired predetermined area of the support surface, second means to move the head from the second position to a third position clampingly engaging the faying surface of the article to the predetermined area of the support surface during the heating of the article.

3. The fixture of claim 1, wherein the means interconnecting the carrier structure and head structure includes bearing mountings to permit the core to partially rotate simultaneously about two substantially perpendicularly disposed axes.

4. The fixture of claim 1, wherein the head structure comprises said core in cooperation with a yoke member with a base and pair of upstanding legs, bearing means pivotally securing the extremities of the core legs with the extremities of the yoke legs creating a first axis of rotation for the core, bearing means pivotally securing the base of the yoke to the carrier structure creating a second axis of rotation for the core substantially perpendicularly disposed to the first axis.

5. The fixture of claim 1, wherein the article receiving and positioning element includes a block member secured between the legs of the core with a magnet device secured to said block member adapted to accept and retain a tab-like extension to a flat adhesive carrying base of said metal article to orient the upper surface of the base of the article beneath the end surfaces of the core while retaining the tab-like extension within the core.

6. The fixture of claim 1, wherein the carrier structure includes a cantilever beam pivotally mounted to a fixed base, the free extremity of the beam carrying a lever arm, the lever arm pivotally mounted, intermediate its extremities to the free extremity of the beam and carrying the head structure at its upper extremity, a first motor means connecting the fixed base to the cantilever beam at a position intermediate its extremities adapted to selectively rotate the cantilever beam about its pivotal mounting with the fixed base, a second motor means connecting the lower extremity of the lever arm to the cantilever beam at a position intermediate the extremities of said cantilever beam adapted to selectively rotate the lever arm about its pivotal mounting with the cantilever beam to bring the head structure into clamping engagement with the predetermined area of said support surface.

7. The fixture of claim 6, wherein the head structure includes a yoke member in cooperation with the core and article positioning element, the yoke member configured to include a base and pair of legs upstanding therefrom, the base of the yoke mounted, with bearing means, to the upper extremity of the lever arm with the longitudinal axis of the lever arm extending in substantially the same direction as an axis of rotation of said yoke created by said bearing means, the legs of the core pivotally mounted to the legs of the yoke with bearing means adjacent the free extremities of each of the legs.

8. The fixture of claim 5, further including an electric switch means secured to the block to detect the presence of an associated metal article in the article receiving and positioning element.

9. The fixture of claim 4, including abutment means to limit the rotation of the yoke member relative to the carrier structure.

10. The fixture of claim 6, wherein the motor means are air cylinder devices adapted to operate in sequence with the first motor means elevating the cantilever means to a position where the head is proximate the predetermined area of said support surface, followed by the second motor means rotating the lever arm to bring the head into clamping engagement with said predetermined area.

11. The fixture of claim 1, wherein the article receiving and positioning element comprises a plate-like element of nonconductive material fixedly secured relative to the core bridging the end surfaces of the core legs, aperture means formed in said plate adapted to receive protruding sections of an associated article to orient and laterally position said article into operative association with the end surfaces of the core legs.

12. The fixture of claim 11, wherein the carrier structure comprises a plurality of posts in surrounding relationship to the head structure, the upper extremities of the posts and associated regions of the perimeter of the plate-like element interconnected with tension spring means permitting the core with an article carried thereon to move relatively freely when the plate element and support surface are brought in juxtaposed clamped relationship.

13. The fixture of claim 12, wherein a compression spring means is interposed between the carrier structure and the head structure, said compression spring means located along an axis which extends transverse the bight portion of the U-shaped core and substantially parallel to the legs of the core serving to bias the head outwardly relative to the carrier.

14. The fixture of claim 11, wherein the plate-like element is generally rectangular in perimeter configuration including a centrally disposed aperture and pair of laterally spaced slots on either side of the central aperture, said slots being aligned with the end surfaces of the core.

15. The fixture of claim 14, including tension spring means interconnecting the corners of the plate-like element to corner post sections of the carrier surrounding the head structure.

16. The fixture of claim 11, wherein the head structure further includes nonconductive frame embracing and fixed to the core with the plate-like article receiving element also being secured to said frame.

17. The fixture of claim 1, wherein the mounting means for the head permits free compound movement of the core with the metal article fixedly positoned thereto in directions transverse the plane of the faying surface and support surface but restricts movement of the head in the plane of said faying surface.

* * * * *